US012228937B2

(12) United States Patent
Huh et al.

(10) Patent No.: US 12,228,937 B2
(45) Date of Patent: Feb. 18, 2025

(54) TRAJECTORY GENERATION OF A ROBOT USING A NEURAL NETWORK

(71) Applicant: SAMSUNG ELECTRONICS CO., LTD., Suwon-si (KR)

(72) Inventors: Jinwook Huh, Millburn, NJ (US); Ibrahim Volkan Isler, Saint Paul, MN (US); Daniel Dongyuel Lee, Tenafly, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 672 days.

(21) Appl. No.: 17/377,890

(22) Filed: Jul. 16, 2021

(65) Prior Publication Data

US 2022/0276657 A1    Sep. 1, 2022

Related U.S. Application Data

(60) Provisional application No. 63/155,146, filed on Mar. 1, 2021.

(51) Int. Cl.
  *G05D 1/00* (2024.01)
  *G06N 3/045* (2023.01)
  *G06T 17/00* (2006.01)

(52) U.S. Cl.
  CPC ......... *G05D 1/0221* (2013.01); *G05D 1/0246* (2013.01); *G06N 3/045* (2023.01); *G06T 17/00* (2013.01); *G06T 2207/10028* (2013.01)

(58) Field of Classification Search
  CPC .. G05D 1/0221; G05D 1/0246; G05D 1/0217; G06N 3/045; G06N 3/0464; G06N 3/084; G06N 3/09; G06T 17/00; G06T 2207/10028

USPC ......... 701/27, 524, 23, 28, 25, 26, 301, 532, 701/408, 410, 533, 400, 450, 409, 446, 701/98, 44

See application file for complete search history.

(56) References Cited

U.S. PATENT DOCUMENTS

| | | | |
|---|---|---|---|
| 2019/0235512 A1 | 8/2019 | Sinyavskiy et al. | |
| 2020/0139959 A1* | 5/2020 | Akella | G05D 1/0088 |
| 2020/0239029 A1* | 7/2020 | Kim | G06V 20/56 |
| 2021/0089036 A1* | 3/2021 | Banzhaf | G05D 1/02 |
| 2022/0164653 A1* | 5/2022 | Ariki | G05D 1/02 |

FOREIGN PATENT DOCUMENTS

WO    WO-2019011537 A1 *   1/2019    ............ B60W 30/06

* cited by examiner

*Primary Examiner* — Anne Marie Antonucci
*Assistant Examiner* — Jodi Jones
(74) *Attorney, Agent, or Firm* — Sughrue Mion, PLLC

(57) ABSTRACT

A system and a method for generating a trajectory of a target device from a current position to a goal position within an environment is provided. The method may include: inputting physical workspace information associated with the environment in which the target device, to a first neural network to obtain a set of weights representing a cost-to-go function that defines a cost-to-go function relating to a length of a collision-free path from one position to the goal position; configuring a second neural network based on the set of weights; identifying a next position of the target device based on the current position and a motion control input of the target; and inputting the identified next position of the target device and the goal position to the second neural network to identify the trajectory to the goal position, and the motion control input corresponding to the trajectory.

18 Claims, 13 Drawing Sheets

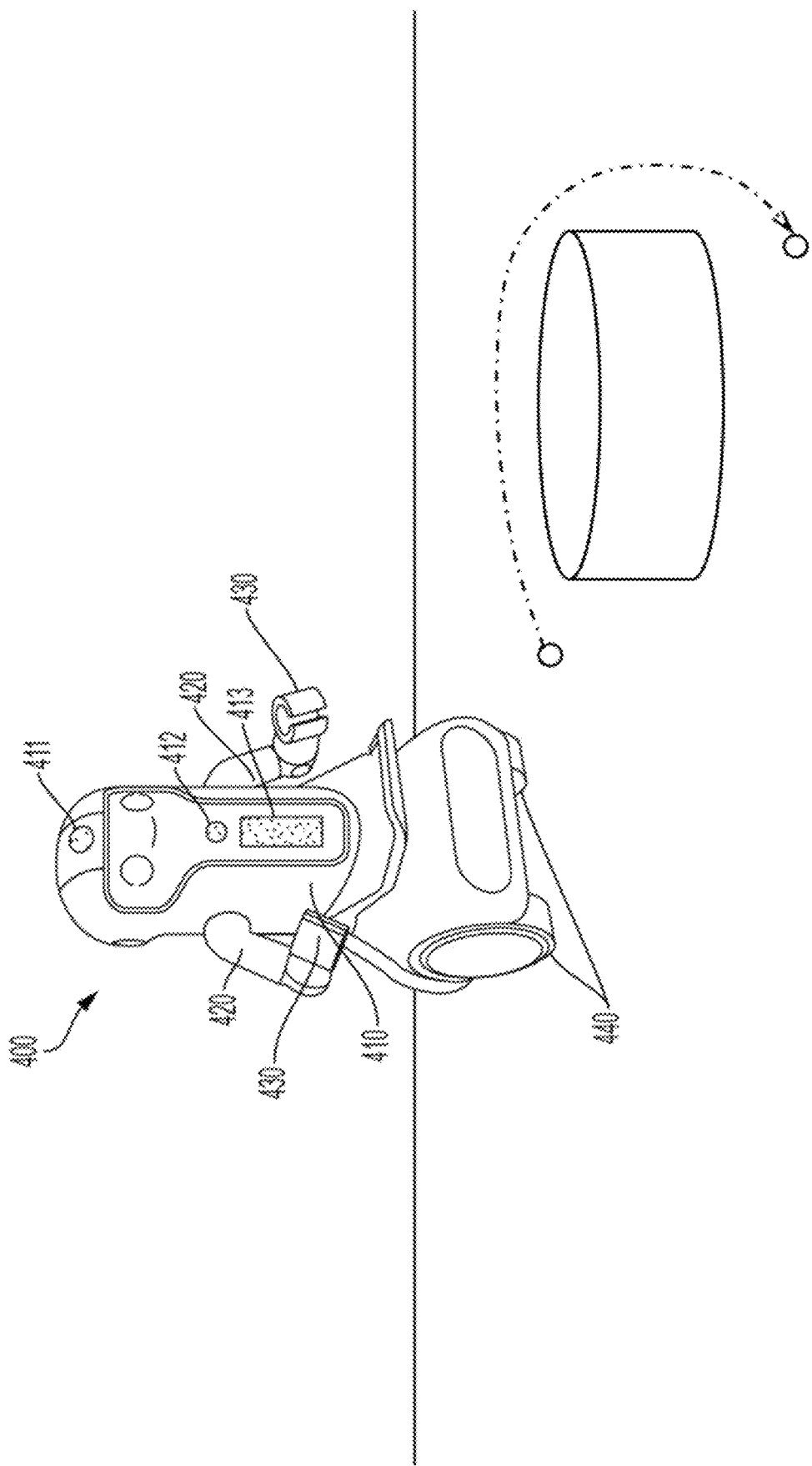

TRAJECTORY GENERATION OF A ROBOT USING A NEURAL NETWORK

CROSS-REFERENCE TO RELATED APPLICATION(S)

This application is based on and claims priority under 35 U.S.C. § 119 to U.S. Provisional Patent Application No. 63/155,146, filed on Mar. 1, 2021 in the U.S. Patent and Trademark Office, the disclosure of which is incorporated by reference herein in its entirety.

BACKGROUND

1. Field

The disclosure relates to systems and methods for generating a trajectory of a non-holonomic robot from an initial position to a goal position in a cluttered environment while steering away from obstacles in the environment, and identifying motion control inputs that enable the non-holonomic robot to move along the trajectory.

2. Description of Related Art

Many robotics applications need motion planning to move a robot from an initial configuration (e.g., an initial position or any given position) to a goal configuration (e.g., a goal position) while satisfying constraints and avoiding obstacles to solve one of the fundamental problems in robotics. Motion planning algorithms reason about the physical workspace in which the robot operates as well as the robot's configuration space (C-space) which relates the robot pose to the physical space. Workspace and configuration space information can be combined into a free configuration space map which partitions the space into regions that either are in collision or are free.

Robotic systems such as car-like robots are subject to inherent non-holonomic constraints by kinematics. These constraints make motion planning more difficult since two feasible configurations may not be directly connected via a C-space shortest path due to kinematic constraints.

Solutions for non-holonomic motion planning in cluttered environments include traditional lattice-based planners which apply discrete search with a sequence of predefined control primitives. Rapidly-exploring Random Tree (RRT) planners solve kinodynamic problems by randomly exploring on C-space with random continuous control inputs. However, in non-holonomic systems, they require exhaustive random samples and collision checks as well as post-processing for smoothing.

There are conventional approaches to the optimal trajectory for non-holonomic systems such as navigation functions and differential dynamic programming, but these conventional approaches are vulnerable to local minima and difficult to tune parameters in cluttered environments.

Recently, deep neural networks have been proposed for motion planning, which exploit successful trajectories by traditional motion planners to create training datasets. However, previous neural network approaches are computationally burdensome for practical robots, involving extensive collision checking and considerable iterative propagation of cost values.

Since all data samples are not equally important for the training of neural networks, there has been a demand for adaptive sampling training data to accelerate the training of the neural network and thereby to improve performance.

SUMMARY

One or more example embodiments provide neural network based-motion planning that uses an adaptive sampling method which captures high curvature regions in a cost-to-go value map for non-holonomic systems.

According to an aspect of an example embodiment, there is provided an electronic device for generating a trajectory of a target device from a current position to a goal position within an environment. The electronic device may include: a memory configured to store instructions; and a processor configured to execute the instructions to: obtain physical workspace information associated with the environment in which the target device is configured to operate with non-holonomic constraints; input the physical workspace information to a first neural network to obtain a set of weights representing a cost-to-go function relating to a length of a collision-free path from one position to the goal position; identify a next position of the target device based on the current position and a motion control input of the target device; configure a second neural network based on the set of weights that are output from the first neural network, wherein the second neural network is trained to estimate the length of the collision-free path based on a training dataset that is selected through an adaptive sampling method of increasing a sampling probability based on a cost-to-go gradient of the length of the collision-free path; and input the identified next position of the target device and the goal position to the second neural network to identify the trajectory to the goal position, and the motion control input corresponding to the trajectory.

The training dataset may be collected by: generating a Reed-Shepp tree based on sample physical workspace information; expanding the Reed-Shepp tree based on a Rapidly-Exploring Random Tree Star (RRT*) algorithm to obtain an expanded tree; and obtaining the training dataset from the expanded tree.

The obtaining the training dataset from the expanded tree may include: sampling a tuple from the expanded tree, wherein the tuple may include a first pair of two positions and a corresponding ground-truth cost-to-go between the first pair of two positions; and sampling a second pair of two positions from RRT* vertices of the expanded tree within a minimum turning radius of the target device.

The training dataset may be collected by: after obtaining the training dataset from the expanded tree, sampling the training dataset based on a ratio of a cost-to-go gradient of a sample pair of two positions to a corresponding Euclidean distance gradient.

The sampling the training dataset may include: sampling the sample pair of two positions with the sampling probability that increases in direct proportion to the ratio.

The control input may include any one or any combination of a longitudinal velocity, a steering angle, and a gear direction of the target device.

The first neural network and the second neural network may be jointly trained to minimize a loss between the estimated length of the collision-free path and a ground-truth length, by back propagating the loss to the first neural network and the second neural network.

The physical workspace information may be a two-dimensional image of the environment or a point cloud associated with the environment.

The electronic device and the target device may correspond to an autonomous driving device that includes: wheels; a camera configured to capture an image of the environment, to obtain the physical workspace information; and an input interface configured to receive the goal position. The autonomous driving device may be configured to control the wheels according to the motion control input to travel along the trajectory.

The electronic device may be a server and the target device may be an autonomous driving device. The server may include an input interface configured to receive the goal position through a user command. The autonomous driving device may include: wheels; a camera configured to capture an image of the environment; and a communication interface configured to: transmit the image of the environment to the server, to enable the server to obtain the physical workspace information based on the image; and receive, from the server, the motion control input corresponding to the trajectory. The autonomous driving device may be configured to control the wheels according to the motion control input to travel along the trajectory.

According to an aspect of an example embodiment, there is provided a method for generating a trajectory of a target device from a current position to a goal position within an environment, the method including: obtaining physical workspace information associated with the environment in which the target device is configured to operate with non-holonomic constraints; inputting the physical workspace information to a first neural network to obtain a set of weights representing a cost-to-go function relating to a length of a collision-free path from one position to the goal position; identifying a next position of the target device based on the current position and a motion control input of the target device; configuring a second neural network based on the set of weights that are output from the first neural network, wherein the second neural network is trained to estimate the length of the collision-free path based on a training dataset that is selected through an adaptive sampling method of increasing a sampling probability based on a cost-to-go gradient of the length of the collision-free path; and inputting the identified next position of the target device and the goal position to the second neural network to identify the trajectory to the goal position, and the motion control input corresponding to the trajectory.

The training dataset may be collected by: generating a Reed-Shepp tree based on sample physical workspace information; expanding the Reed-Shepp tree based on an a Rapidly-Exploring Random Tree Star (RRT*) algorithm to obtain an expanded tree; and obtaining the training dataset from the expanded tree.

The obtaining the training dataset from the expanded tree may include: sampling a tuple from the expanded tree, wherein the tuple includes a first pair of two positions and a corresponding ground-truth cost-to-go between the first pair of two positions; and sampling a second pair of two positions from RRT* vertices of the expanded tree within a minimum turning radius of the target device.

The method may further include: after obtaining the training dataset from the expanded tree, sampling the training dataset based on a ratio of a cost-to-go gradient of a sample pair of two positions to a corresponding Euclidean distance gradient.

The sampling the training dataset may include: sampling the sample pair of two positions with the sampling probability that increases in direct proportion to the ratio.

The control input may include any one or any combination of a longitudinal velocity, a steering angle, and a gear direction of the target device.

The first neural network and the second neural network may be jointly trained to minimize a loss between the estimated length of the collision-free path and a ground-truth length, by back propagating the loss to the first neural network and the second neural network.

The physical workspace information may be a two-dimensional image of the environment or a point cloud associated with the environment.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 14 illustrates a service robot performing an assigned task in a cluttered environment according to embodiments of the present disclosure.

DETAILED DESCRIPTION

The following detailed description of example embodiments refers to the accompanying drawings. The same reference numbers in different drawings may identify the same or similar elements.

The example embodiments of the present disclosure are directed to generating a trajectory of a non-holonomic robot from a first configuration to a second configuration within an environment while steering away from obstacles, via neural networks that are trained using datasets that are selected through an adaptive sampling method.

Through the adaptive sampling method, the neural networks are capable of generating an optimal trajectory for a non-holonomic system (e.g., an autonomous driving robot or vehicle having non-holonomic motion constraints) with a shorter processing time than the related art.

Figure 1:
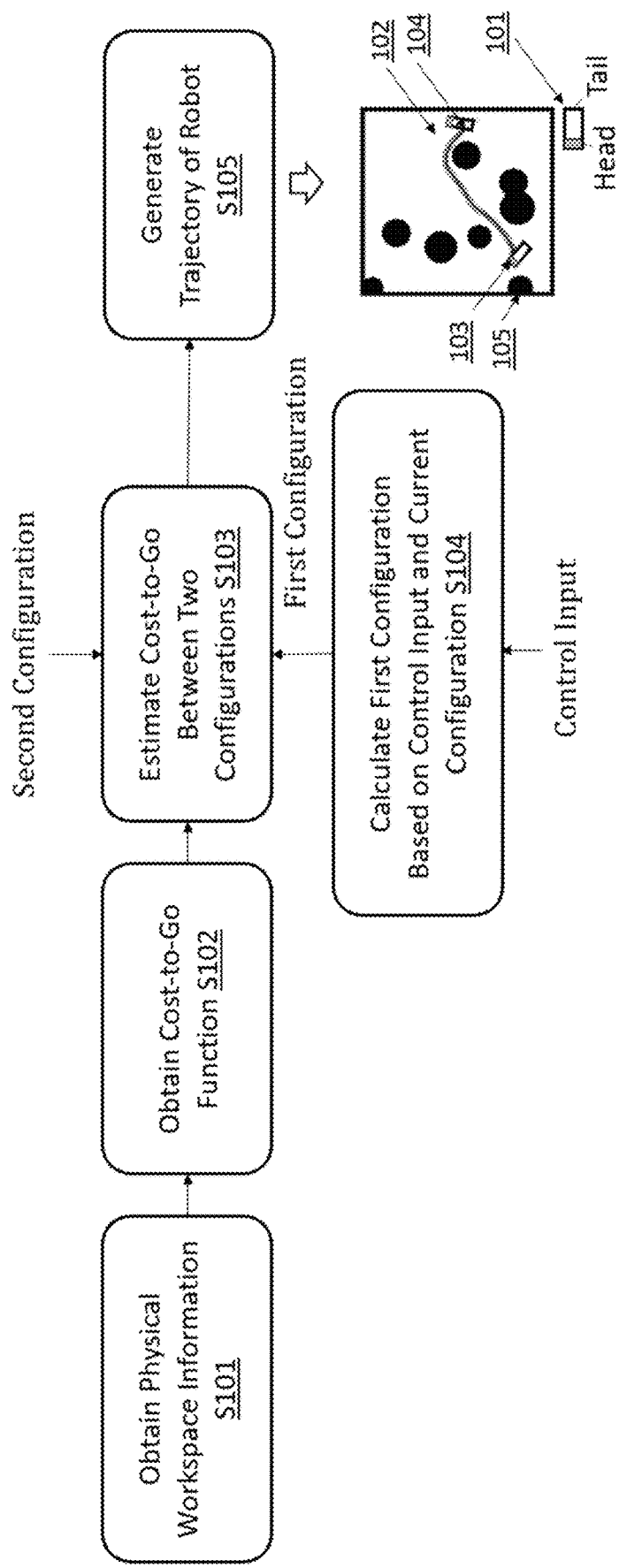
FIG. 1 is a diagram illustrating a method for generating a trajectory of a robot from a first configuration to a second configuration within an environment while steering away from obstacles according to an embodiment.

FIG. 1 is a diagram illustrating a method for generating a trajectory of a robot from a first configuration to a second configuration within an environment while steering away from obstacles according to an embodiment. The term "configuration" may refer to a position in motion planning.

The robot may be subject to non-holonomic motion constraints, such as rolling constraints that limit the possible directions of motion. For example, the robot may have car-like motion constraints, such that the robot is not capable of moving sideways directly, and may need to move forwards or backwards in order to make a turn.

As shown in FIG. 1, a method for generating a trajectory 102 of a robot 101 from a first configuration 103 to a second configuration 104 within an environment while steering away from obstacles 105 may include: a process of obtaining physical workspace information S101, a process of obtaining a cost-to-go function S102, a process of configuring a neural network and estimating a cost-to-go value from a first configuration to a second configuration S103, a process of calculating a first configuration S104, and a process of generating a trajectory of a robot S105.

Figure 5:
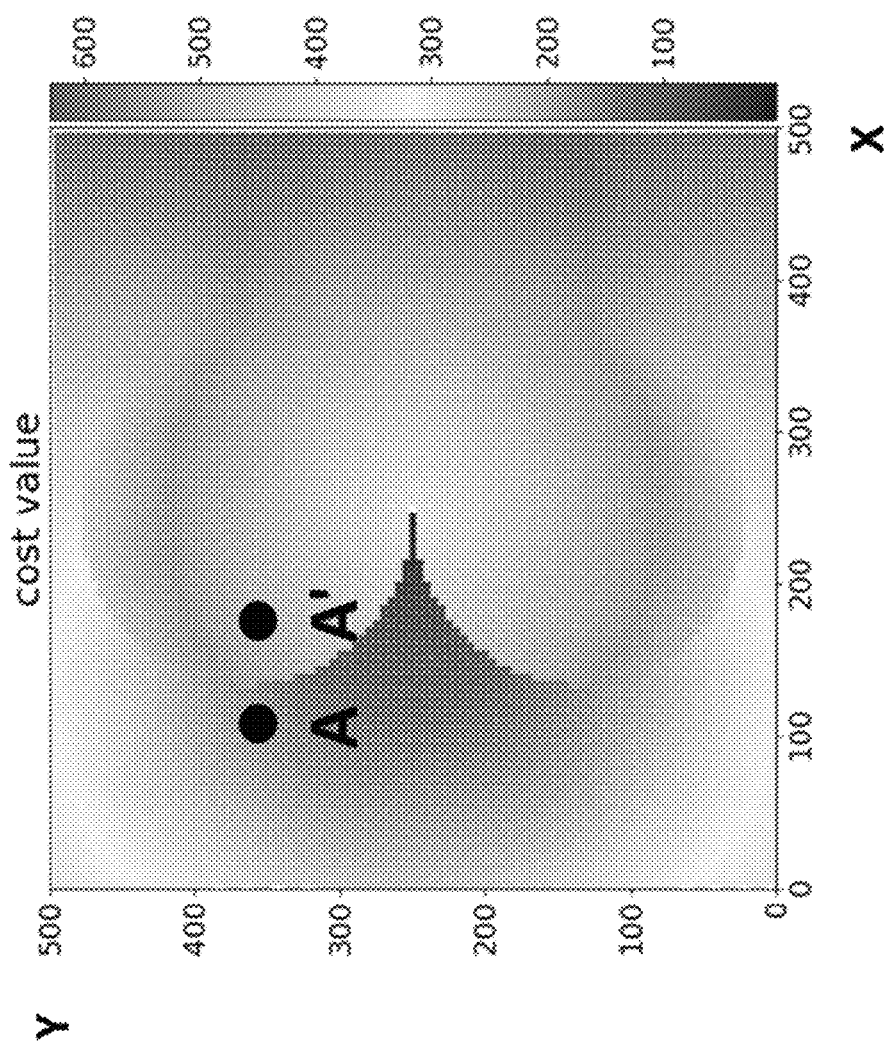
FIG. 5 illustrates a cost-to-go value map in an X-Y plane according to an example embodiment of the present disclosure.

The term "cost" or "cost-to-go" may refer to a length of a collision free path from a first configuration to a second configuration. For example, a configuration that is close to the second (goal) configuration may have a relatively low cost, whereas a configuration that is farther from the second (goal) configuration may have a greater cost. As example, a configuration with the cost "1" may be close to the second (goal) configuration, and a configuration with the cost "8" may be farther from the second (goal) configuration. As shown in FIG. 5, the robot 101 may generate a cost-to-go value map that associates each configuration within the environment with a respective cost.

In operation S101, physical workspace information is obtained in association with the environment in which the robot 101 is configured to operate. The robot 101 may be implemented as any type of an autonomous driving device, such as an autonomous vehicle, a delivery robot, a serving robot, and the like.

An image of an environment around the robot 101 may be captured using a camera mounted in the robot 101 or an external camera that monitors the environment, to be used as the physical workspace information. In another example, the environment may be scanned using a Light Detection and Ranging (LiDAR) sensor mounted in the robot 101, to provide the scan of the environment as the physical workspace information. Also, map data associated with the environment may be retrieved from a local storage of the robot 101 or obtained via the Internet, to be used as the physical workspace information.

In operation S102, a cost-to-go function that defines a length of a collision-free path of the non-holonomic robot from a given configuration to a goal configuration, is obtained using a first neural network.

The first neural network may be a higher-order function network. The first neural network may be configured to receive, as input, the physical workspace information, and output a set of weights that represents the cost-to-go function. The set of parameters may include information for generating a configuration space map that partitions the environment into collision regions and non-collision regions, based on the physical workspace information.

For a specific workspace W, the cost-to-go function returns the cost between two configurations $f_w: C \times C \rightarrow [0, \infty)$, where $f_w$ is a cost-to-go function for any given configurations s and t in a configuration space C, which returns the cost for the nonholonomic robot to traverse a collision-free path while satisfying the nonholonomic constraint from s to t. The first neural network is trained to output a "function" of cost-to-go instead of cost-to-go "values" on the configuration space. The structure of the first neural network will be further described later with reference to FIG. 3.

In operation S103, a second neural network is formed or configured based on the set of weights that is output from the first neural network, to estimate a cost-to-go value from the first configuration to the second configuration.

For example, the second neural network may be formed by assigning the weights to a plurality of nodes of the second neural network. A topology of the second neural network may be predetermined to have a certain number of layers and a certain number of nodes at each layer, and connections between the layers and nodes may be also predetermined and pre-stored, so that the second neural network can be generated once the weights are obtained from the first neural network.

The second neural network may obtain the first configuration and the second configuration, as input. The first configuration may refer to a position to which the robot is expected to arrive when a given control input (also referred to as "motion control input") is applied to the robot at the current position. The second configuration may refer to a goal position of the robot that is set by a user or an operator.

The first configuration may be obtained through operation S104, in which a forward kinematics function of the robot is used to calculate the first configuration, based on a control input and a current configuration.

In operation S104, a next configuration $q_{k+1}$ may be calculated based on the current configuration $q_k$ and the control input u. The control input u may be any one or any combination of a longitudinal velocity input, a steering angle input, and a gear direction input to the robot. The next configuration $q_{k+1}$ calculated in operation S104 may be input to the second neural network, as the first configuration.

Referring back to operation S103, the second neural network may obtain the first configuration, through operation S104, and the second configuration through a user or operator input, and may output an estimated cost-to-go from the first configuration to the second configuration.

Operations S103 and S104 may be iterated to update the control input and the first configuration, until a trajectory of the robot 101 from the initial first configuration to the second (goal) configuration is obtained, wherein the updated first configurations may form waypoints of the trajectory and may correspond to the updated control inputs.

In operation S105, a trajectory of the robot 101 is generated based on a sequence of the (updated) first configurations that minimize the estimated cost-to-go. In order to move the robot 101 along the generated trajectory, the control inputs corresponding to the sequence of the (updated) first configurations are applied to the robot 101.

Under the assumption that the robot has a minimum turning radius $\rho$ and a configuration space given by $C=R^2 \times S^1$, a configuration $q \in C$ is denoted as $q=(x, y, \theta)$ and its time derivative $\dot{q}=(\dot{x}, \dot{y}, \dot{\theta})$, wherein $\theta$ denotes an orientation of the robot, and the robot has a non-holonomic constraint such that $\dot{x} \cos \theta - \dot{y} \sin \theta = 0$, the optimal control input may be obtained based on Equation (1):

$$u_k^*(q_k, q_{goal}) = \underset{u'}{\operatorname{argmin}} \{l(q_k, u') + L^*(q_{k+1}, q_{goal})\} \quad \text{Equation (1)}$$

$$q_{k+1} = g(q_k, u)$$

Where $l(q_k, u')$ is a constant cost given control input u, $q_{goal}$ is a goal configuration, g is forward kinematics function of the robot, and $L^*(q_{k+1})$ is the minimum cost-to-go value at $q_{k+1}$.

For example, the robot may generate a trajectory from the first configuration to the second configuration based on a set of cost-to-go values. In particular, the robot may generate the trajectory based on a gradient of the set of cost-to-go values. For example, the robot may generate the trajectory to pass through configurations (e.g., waypoints) from the first configuration to the second configuration such that the cost-to-go values of the configurations decrease.

As shown in FIG. 1, the robot 101 may generate a trajectory 120 from the first configuration 103 to the second configuration 104 by following the gradient of the set of cost-to-go values, while steering away from obstacles 105. In this way, the embodiments of the present disclosure can generate a continuous set of cost-to-go values associated with a set of configurations of the robot with respect to the second configuration over an entire configuration space map.

Figure 2:
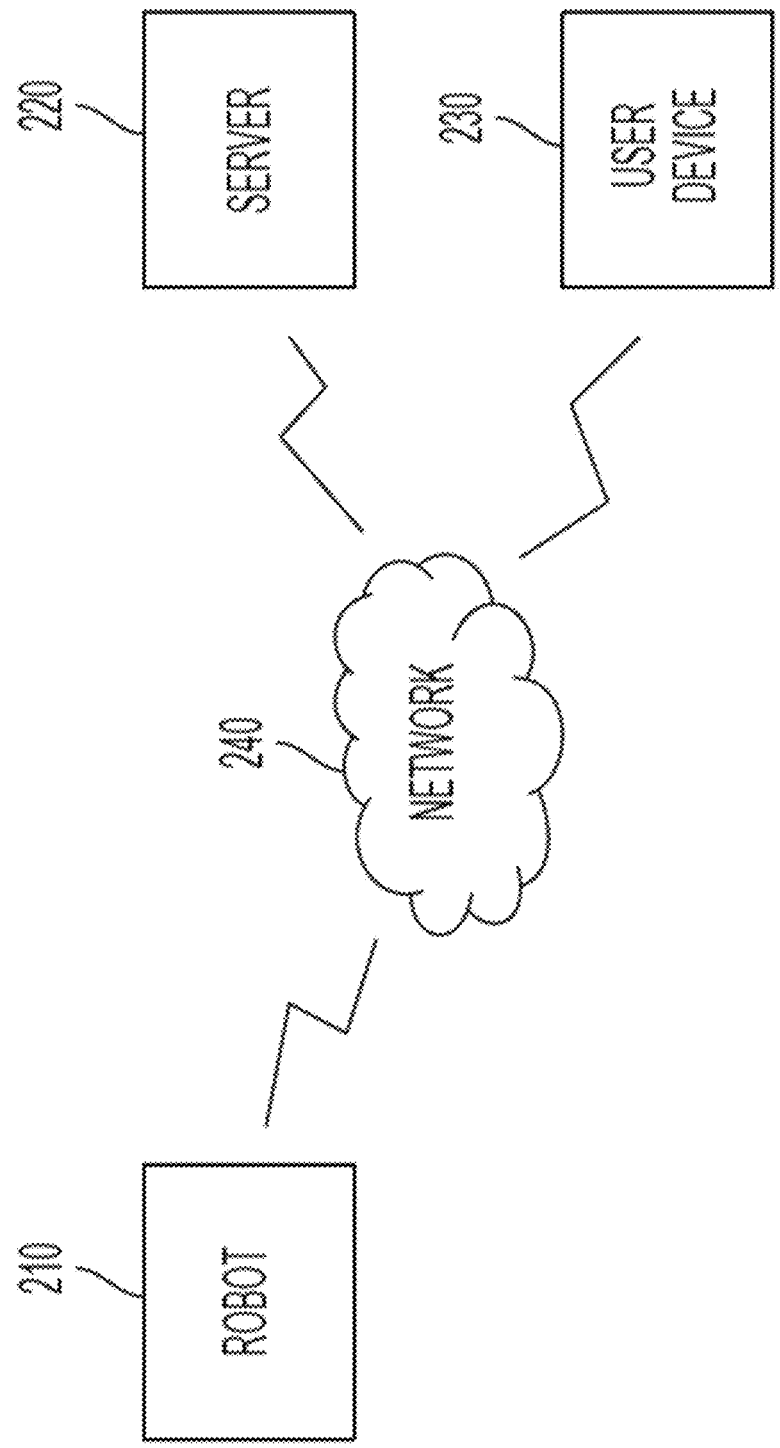
FIG. 2 is a diagram of a system for generating a trajectory of a robot from a first configuration to a second configuration within an environment while steering away from obstacles according to an embodiment.

FIG. 2 is a diagram of a system for generating a trajectory of a robot from a first configuration to a second configuration within an environment while steering away from obstacles according to an embodiment.

FIG. 2 includes a robot 210, a server 220, a user device 230, and a network 240. The robot 210, the server 220, and the user device 230 may interconnect via wired connections, wireless connections, or a combination of wired and wireless connections.

The robot 210 includes one or more devices for generating a trajectory from a first configuration to a second configuration within an environment while steering away from obstacles, and identifying control inputs that enable the robot 210 to travel along the trajectory. For example, the robot 210 may be a robot used for industrial applications, service applications, military applications, vehicular applications, or the like.

The robot 210 may obtain physical workspace information associated with an environment in which the robot is configured to operate. For example, the robot 210 may obtain the physical workspace information based on configuration information, based on obtaining the physical workspace information via a sensor, based on receiving the physical workspace information from the server 220 or the user device 230, based on a predetermined timeframe, based on an instruction, or the like.

The environment may refer to a physical space in which the robot is configured to operate. For example, if the robot is an industrial robot, then the environment may be an area of a manufacturing plant. As another example, if the robot is a service robot, then the environment may be a restaurant.

The physical workspace information may refer to information regarding the environment. For example, the physical workspace information may be a point cloud of the environment, a two-dimensional (2D) image of the environment, a three-dimensional (3D) image of the environment, video information of the environment, coordinate data of the environment, or the like.

A trajectory may refer to a movement path of the robot 210. For example, a trajectory between the first configuration and the second configuration may be a movement path of the robot 210 from the first configuration to the second configuration.

The server 220 includes one or more devices configured to communicate with the robot 210. For example, the server 220 may be configured to provide the robot 210 with physical workspace information, a configuration space map, a trained first neural network, a trained second neural network, weight values of the second neural network, or the like.

The user device 230 includes one or more devices configured to communicate with the robot 210. For example, the user device 230 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. The user device 230 may transmit a control command to the robot 210 or the server 220, to move the robot to a goal configuration, wherein the control command may include a destination position.

The network 240 includes one or more wired and/or wireless networks. For example, the network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment may perform one or more functions described as being performed by another set of devices of the environment.

Figure 3:
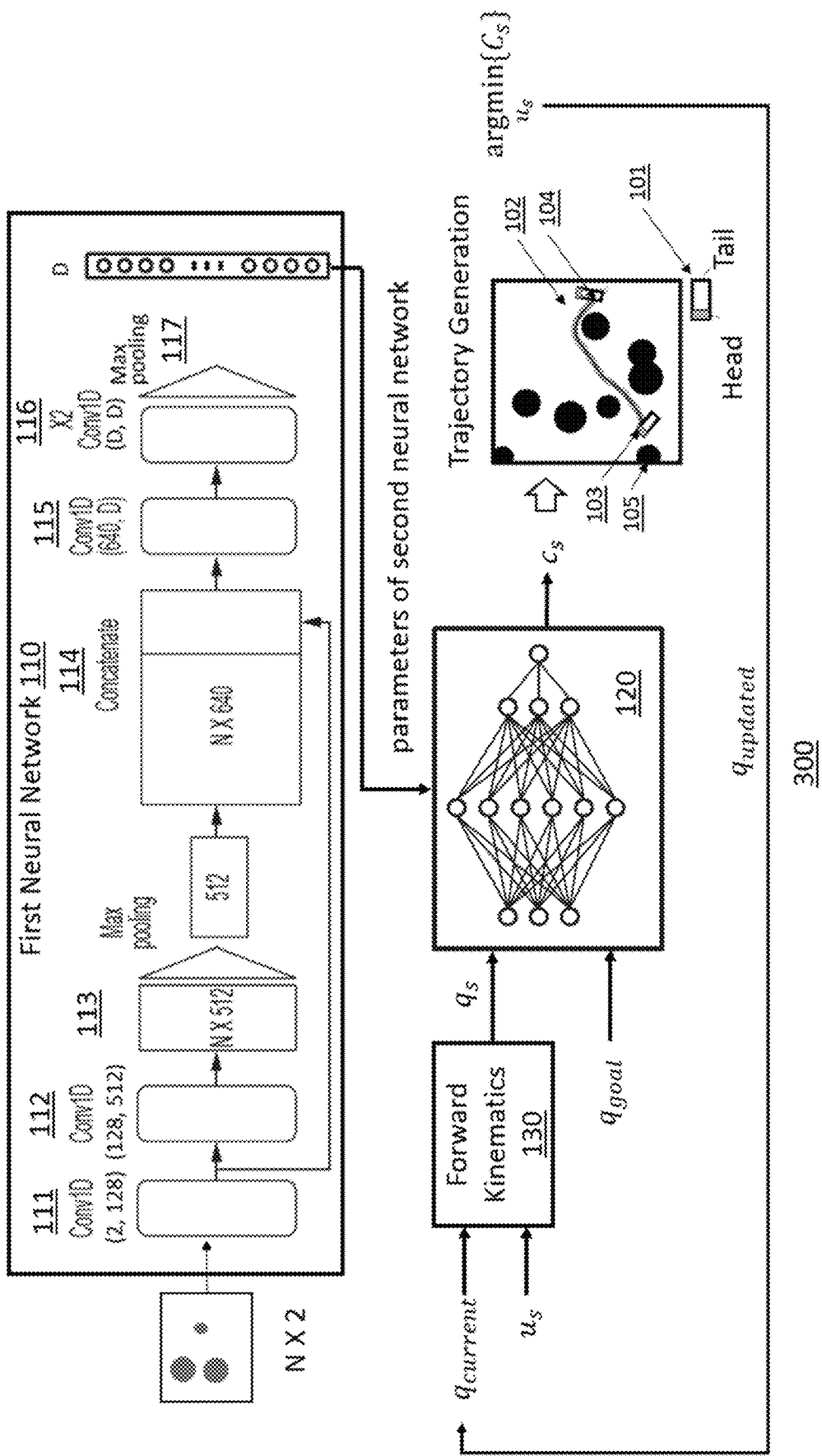
FIG. 3 is a diagram of components of one or more devices of FIG. 2 according to an embodiment.

FIG. 3 is a diagram of components of one or more devices of FIG. 2 according to an embodiment. A device 300 shown in FIG. 3 may correspond to the robot 210, the server 220, and/or the user device 230.

The device 300 may include an artificial intelligence (AI) based model that uses a first neural network 110, a second neural network 120, and a forward kinematics calculation layer 130.

The first neural network 110 may be a high-order function network and may be also referred to as a cost-to-go function generating network. The second neural network 120 may be formed using a set of parameters that are output from the first neutral network 110, and may be also referred to as a cost-to-go function network. The forward kinematics calculation layer 130 may receive a control input and a current configuration, and may calculate a next configuration based on the control input and the current configuration.

The first neural network 110 may include a first one-dimensional (1D) convolutional layer 111, a second 1D convolutional layer 112, a first max pooling layer 113, a concatenation layer 114, a third 1D convolutional layer 115, a fourth 1D convolutional layer 116, and a second max pooling layer 117.

The first 1D convolutional layer 111 may receive, as input, physical workspace information, for example, a two-dimensional (2d) image having has a N number of pixels. For example, the 2D image may be a map of a city or an image showing a restaurant serving area. When the 2D image is formed of 100×100 pixels, 10,000 values corresponding to the 100×100 pixels may be used for the input N. The first 1D convolutional layer 111 may extend two dimensional point features for each pixel to 128 dimensional point features using a feature map, and the second 1D convolutional layer 112 may extend the 128 dimensional point features to 512 dimensional point features, thereby N×512 features are obtained. The first max pooling layer 113 may select, from the N×512 features, 512 max features that describe the N×2 dimensional space. The concatenation layer 114 may concatenate the 512 max features with the 128 dimensional point features output from the second 1D convolutional layer 112, to obtain 640 features. The third 1D convolutional layer 115 may map the 640 features to a D number of features, and the fourth 1D convolutional layer 116 may forward the D number of features to the second max pooling layer 117. The second max pooling layer 117 may output a set of weights (e.g., a cost-to-go function parameters) which is to be used to create the second neural network 120.

The first neural network 110 may perform operation S103 to output a set of parameters that represents a cost-to-function as described with reference to FIG. 1. The set of parameters may include information for generating a configuration space map.

The second neural network 120 is formed based on the set of parameters output from the first neural network 110. The second neural network 120 may perform operation S103 which is described referring to FIG. 1.

In particular, the second neural network 120 may receive, as input, a first configuration $q_s$ and a second configuration $q_{goal}$, and may output a cost-to-go value $C_s$, based on the first configuration $q_s$ and the second configuration $q_{goal}$. The first configuration and the second configuration may correspond to a sample configuration and a goal configuration, respectively, and the second neural network 120 may iterate the inference of the cost-to-value for a plurality of different sample configurations (that are derived from a plurality of different sample control inputs) to find a sample configuration (and a corresponding sample control input) that minimizes the cost-to-go to reach the goal configuration.

The second neural network 120 may obtain the first configuration from the forward kinematics calculation layer 130 which performs operation S104 described with reference to FIG. 1. The forward kinematics calculation layer 130 may receive a current configuration $q_{current}$ and a sample control input $u_s$, and may output a sample configuration $q_s$ that the robot is expected to reach when the sample control input $u_s$ is applied to the robot at the current position $q_s$.

The device 300 may determine or accept the first configuration (e.g., the sample configuration $q_s$) as a next configuration $q_{updated}$ if the cost-to-go from the first configuration (e.g., the sample configuration $q_s$) to the second configuration (e.g., the goal configuration $q_{goal}$) is minimized or has a minimum value among a plurality of sample configurations. The accepted sample configuration $q_s$ and the corresponding sample control unit $u_s$ may be stored in the device 300, to generate the trajectory 102 and to determine a sequence of control inputs that are needed to move the robot 200 along the trajectory 102 The next configuration $q_{updated}$ is provided to the forward kinematics layer 130 to update the current configuration and then the cost-to-go value is calculated based on the updated current configuration. The update process is iterated until an entire trajectory from an initial configuration to the goal configuration is generated.

Figure 4:
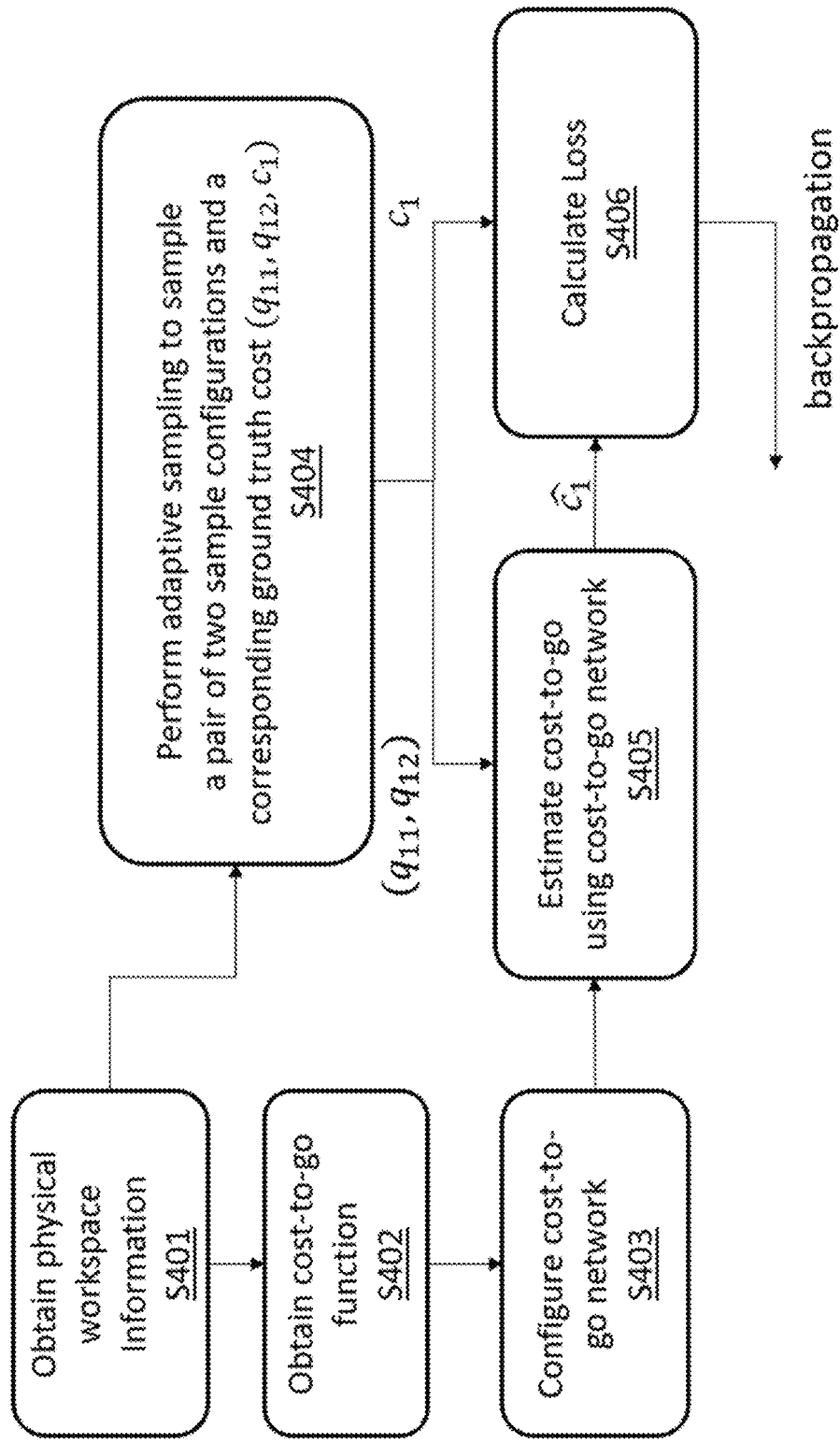
FIG. 4 is a diagram illustrating a method for training a first neural network and a second neural network according to an example embodiment of the present disclosure.

FIG. 4 a diagram illustrating a method for training a first neural network and a second neural network according to an example embodiment of the present disclosure.

In operation S401, a random physical workspace is generated, as a sample environment in which a robot is configured to operate. The physical workspace may refer to information regarding the environment, and may be implemented as a point cloud of the environment, a two-dimensional (2D) image of the environment, a three-dimensional (3D) image of the environment, video information of the environment, coordinate data of the environment, or the like.

In operation S402, a first neural network outputs a set of parameters that represents a cost-to-go function, based on the physical workspace information. The first neural network may have the same or substantially the same structure as the first neural network 110 shown in FIG. 3.

In operation S403, a second neural network is generated based on the set of parameters output from the first neural network. The second neural network may have the same or substantially the same structure as the second neural network 120 shown in FIG. 3.

In operation S404, a training dataset is generated to train the first neural network and the second neural network. The training dataset may be constituted as a pair of configurations and a corresponding ground-truth cost-to-go value, and the training dataset may be generated through an adaptive sampling method.

Referring to FIG. 5 illustrating a cost-to-go value map in an X-Y plane, configurations that have relatively high cost gradients may be selectively sampled as training data according to the adaptive sampling method. For example, a pair of configurations A and A' in the region with a high cost-to-go curvature may be sampled. The adaptive sampling method according to an example embodiment will be further described later with reference to FIG. 6.

Referring back to FIG. 4, in operation S404, the adaptively sampled configurations and their corresponding ground-truth cost values are provided to the second neural network and a loss calculator, respectively. The second neural network estimates a cost-to-go value based on the adaptively sampled pair of configurations, and the loss calculator computes a loss function of the estimated cost value, based on the ground-truth cost value corresponding to the pair of configurations.

In operation S405, the second neural network receives, as input, the pair of configurations that are adaptively sampled through operation S404, and output an estimated cost-to-go value based on the two configurations.

For example, each training dataset may be constituted as a tuple of pair of two sample configurations and a corresponding ground truth cost ($q_{11}$, $q_{12}$, $c_1$), and among the three components of the tuple, the pair of two sample configurations ($q_{11}$, $q_{12}$) is fed to the second neural network to estimate the cost value $\hat{c}_1$, and the ground truth cost-to-go value $c_1$ is fed to a loss calculator for computation of a loss.

In operation S406, a loss between the estimated cost-to-go value $\hat{c}_1$ and the ground-truth cost-to-go value $c_1$ is calculated, and then is back propagated to the first neural network and the second neural network to minimize the loss. As such, the first neural network and the second neural network are jointly trained in the same training cycle.

For example, a mean-square error (MSE) between the estimated cost-to-go value $\hat{c}_1$ and the ground-truth cost-to-go value $c_1$ may be computed as the loss.

Figure 6:
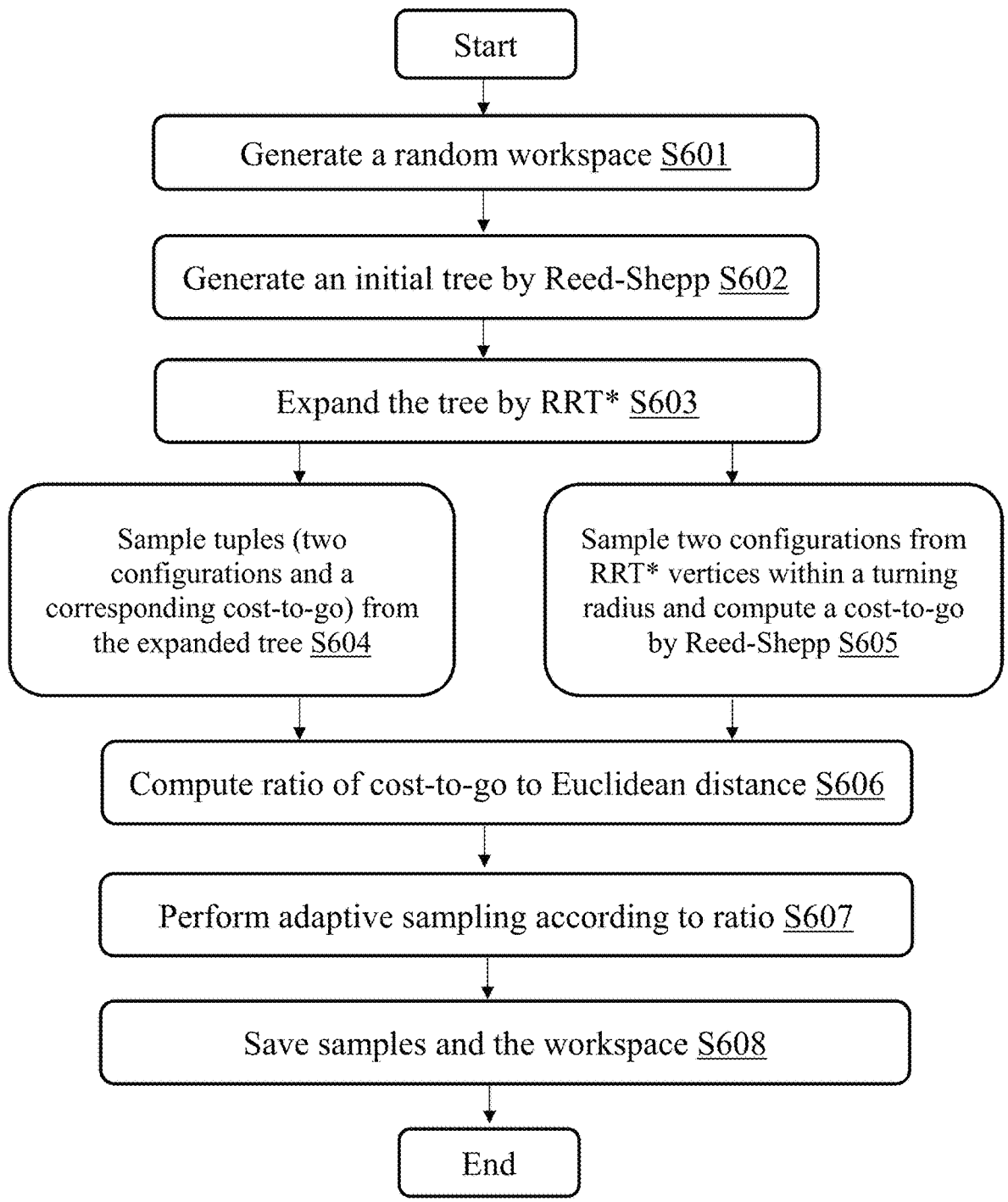
FIG. 6 is a flowchart for generating a training dataset based on an adaptive sampling method according to an example embodiment of the present disclosure.
Figure 7:
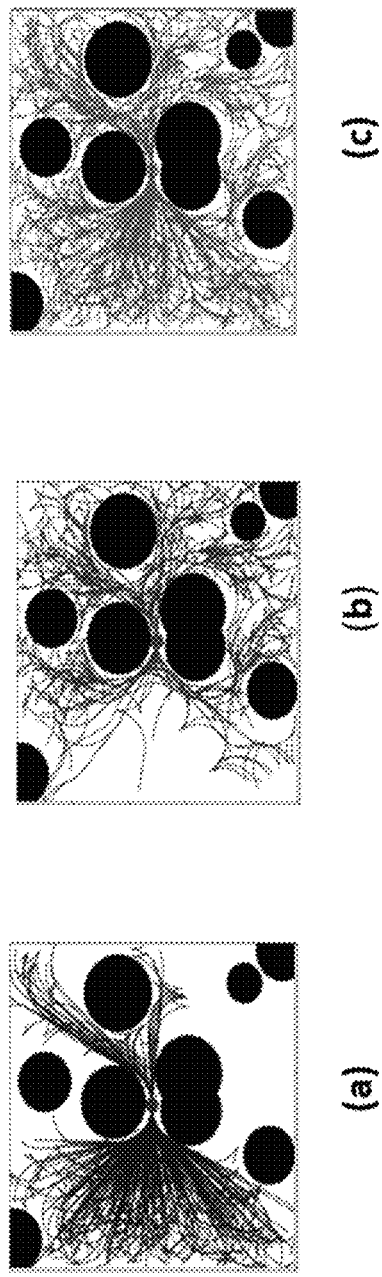
FIG. 7 illustrates an initial collision-free tree by Reeds-Shepp curves, an expanded collision-free tree by RRT*, and an entire tree structure according to an example embodiment of the present disclosure.

FIG. 6 is a flowchart for generating a training dataset based on an adaptive sampling method according to an example embodiment of the present disclosure. FIG. 7 illustrates an initial collision-free tree by Reeds-Shepp curves, an expanded collision-free tree by RRT*, and an entire tree structure.

Since the cost-to-go is as a result of a sequence of control inputs between two configurations (as opposed to a Euclidean distance between the two configurations), an embodiment of the present application provides a method of generating effective dataset for efficient training of the second neural network, unlike a training method in the related art that uses a set of points distributed uniformly over the configuration space.

In operation S601, a random workspace is generated, in a manner similar to operation S401.

In operation S602, an initial tree is generated from a seed by collision-free Reed-Shepp curves based on the random workspace, as shown in image (a) of FIG. 7. The Reed-Shepp curves may refer to the shortest path that connects two configurations in a two-dimensional Euclidean plane (i.e., x-y plane) with a constraint on the curvature of the path and with prescribed initial and terminal tangents to the path, under the assumption that the vehicle traveling the path can only travel forwards or backwards (without a capability of traveling sideways directly).

In operation S603, the initial tree is expanded towards unexplored areas through a rapidly exploring random tree star (RRT*) algorithm, as shown in image (b) of FIG. 7. The expanded tree may be referred to as an RRT* tree.

Under the assumption that the branches in the initial tree by Reeds-Shepp curves (see image (a) of FIG. 7) are optimal, the RRT* algorithm may keep the branches in the initial tree, and rewrite routines by adding new explored nodes and branches. Through the two phase tree construction in operations S602 and S603, the entire tree may be formed as shown in image (c) of FIG. 7.

Referring back to FIG. 6, in operation S604, datasets (e.g., a tuple of two configurations and a corresponding cost-to-go) are sampled from the expanded tree. For example, as shown in FIG. 8, cost-to-go $c_1$ from configuration A to configuration C and cost-to-go $c_2$ from configuration B to configuration C may be sampled from the expanded tree.

In operation S605, two configurations are sampled from vertices of the RRT* tree within a lower bounded turning radius of the robot, and a corresponding cost-to-go is calculated by Reed-Shepp.

Specifically, sample pairs of vertices are obtained from the RRT* tree within a threshold distance $\alpha*\rho$, where $\alpha$ is a constant (e.g., $\alpha=1.5$), and $\rho$ is a lower bounded turning radius by the non-holonomic constraint. The sample pairs of vertices are selected within the lower bounded turning radius since in the region outside of the turning radius, the cost for the collision avoidance is more dominant.

Figure 8:
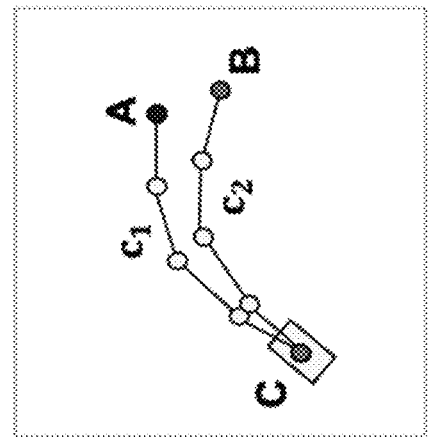
FIG. 8 illustrates exemplary cost-to-go values that are obtained through training data sampling algorithms according to an example embodiment of the present disclosure.

As shown in FIG. 8, the datasets sampled from the RRT* tree may capture cost-to-go $c_1$ from configuration A to configuration C and cost-to-go $c_2$ from configuration B to configuration C, but may not include cost $c_3$ between configuration A and configuration B. Thus, additional sampling may be performed in operation S605, to obtain cost $c_3$ between configuration A and configuration B. In an example embodiment, operations 604 and 605 may be performed in parallel or in sequence.

In operation S606, a ratio of each of the cost-to-go gradients (that are calculated in operations S604 and S605) to a corresponding Euclidean distance gradient, is calculated, to perform adaptive sampling in operation S607. For example, the ratio may be computed based on Equation (2):

$$\text{ratio} = \frac{\Delta C}{\Delta EC}$$

Where $\Delta C$ denotes a cost-to-go gradient and $\Delta EC$ denotes a Euclidean distance gradient.

All data samples may not be equally critical for the neural network performance, and a more effective and informative dataset can accelerate the training and impact the performance of the neural network. Uniform sampling may cover the whole configuration space, but it leads to including redundant data due to biased data distribution. In order to sample an effective dataset, a ratio of the cost-to-go gradient to the Euclidean distance gradient is computed, wherein the higher the ratio is, the more informative the configuration is.

Thus, in operation S607, adaptive sampling is performed according to the ratio, to select configurations that have a higher ratio of the cost-to-go gradient to the Euclidean distance gradient than other configurations, with a higher probability. The probability of selecting a certain pair of configurations may be (directionally and/or linearly) proportional to the ratio of the cost-to-go gradient to the Euclidean distance gradient of the pair of configurations. For example, the higher the ratio is, the higher training weight may be applied to the gradient of the configurations.

Figure 9:
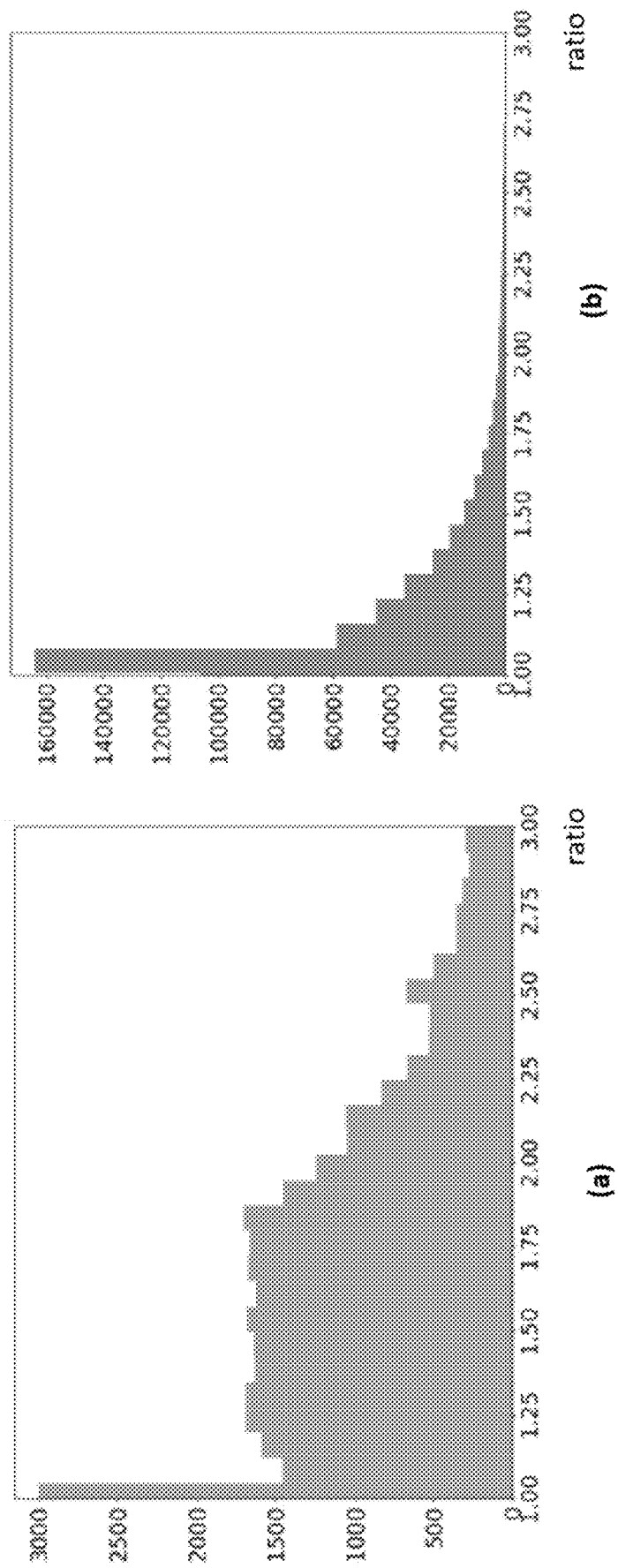
FIG. 9 illustrates histogram (a) showing a sampling result according to an adaptive sampling algorithm in an example embodiment, and histogram (b) showing a sampling result according to a uniform sampling illustrates in the related art.

FIG. 9 illustrates a histogram (a) showing a sampling result according to the adaptive sampling in an example embodiment, in comparison with a histogram (b) showing a sampling result according to uniform sampling in the related art. In an example embodiment, a histogram is generated with regard to the ratio of the cost-to-go gradient to the Euclidean distance gradient.

According to the adaptive sampling according to an example embodiment, the training samples are selected more evenly from each bin with regard to the ratio of the cost-to-go gradient to the Euclidean distance gradient as shown in the histogram (a) of FIG. 9, compared with the uniform sampling in which regions resembling Euclidean distance (i.e., ratio≈1) are heavily sampled, as shown in the histogram (b) of FIG. 9.

Figure 10:
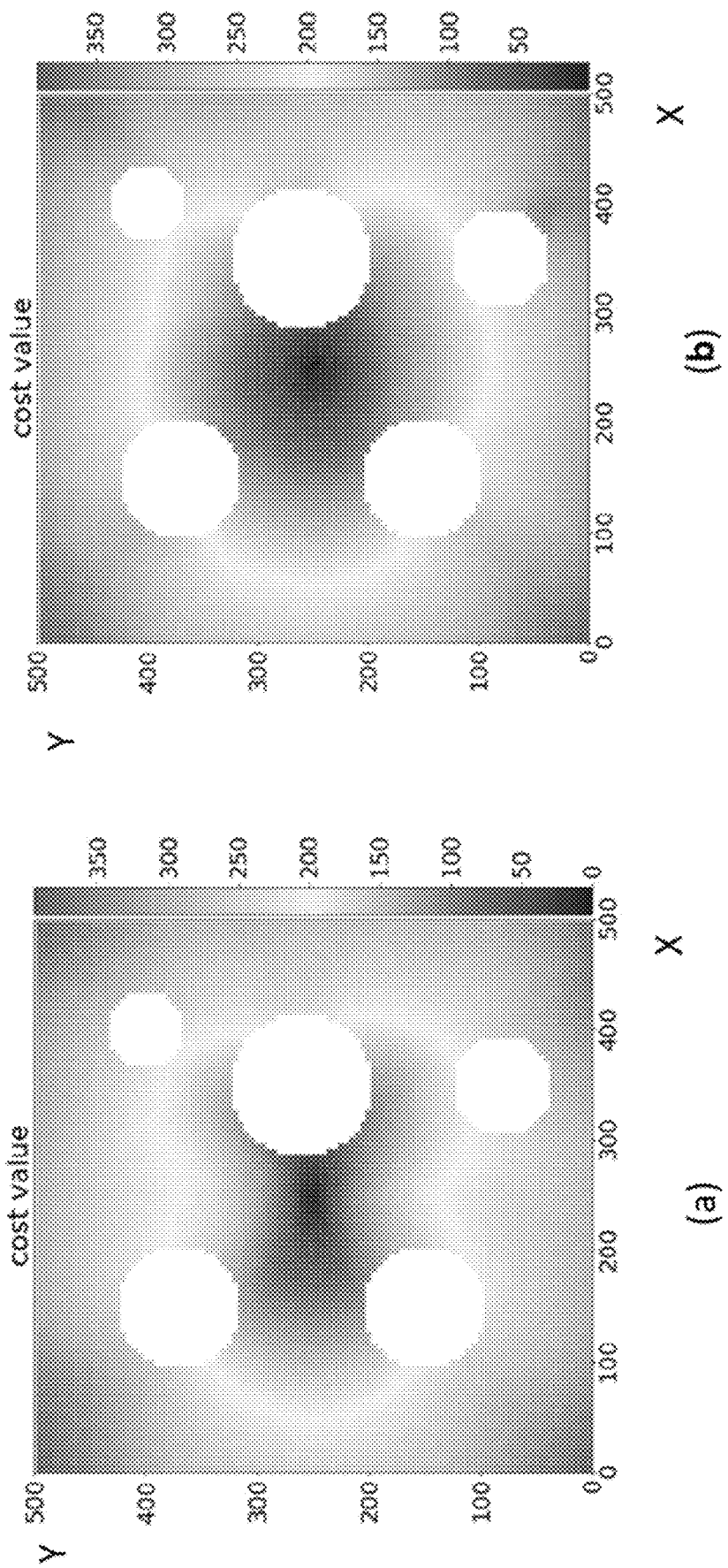
FIG. 10 illustrates a cost-to-go value map (a) showing training datasets that are sampled through an adaptive sampling algorithm in an example embodiment, and a cost-to-go value map (b) showing training datasets that are sampled through a uniform sampling algorithm in the related art.

With reference to image (a) of FIG. 10, training datasets are sampled from high cost gradient areas in a cost-to-go value map according to the adaptive sampling, unlike training datasets that are sampled through the uniform sampling, as shown in image (b) of FIG. 10.

Referring back to FIG. 6, in operation S608, the sample configurations and cost tuples are stored in association with the workspace, to be used as a training dataset for the first neural network and the second neural network.

Figure 11:
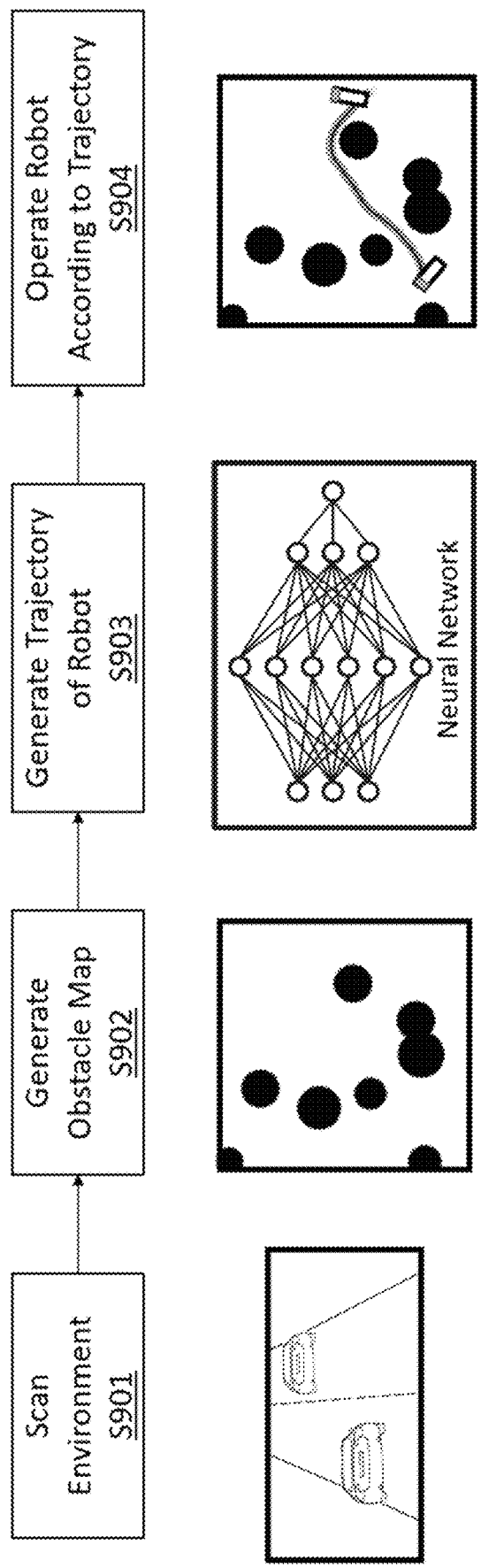
FIG. 11 is a diagram illustrating a method for operating a robot according to an optimal trajectory according to an example embodiment.

FIG. 11 is a diagram illustrating a method for operating a robot according to an optimal trajectory according to an example embodiment.

In operation S901, a robot may scan an environment in which the robot is configured to operate. The robot may capture an image of a front view and side views of the robot using a camera mounted thereon, and may use the capture image as physical workspace information.

In operation S902, the robot may generate an obstacle map based on the physical workspace information, or the robot may transmit the physical workspace information to an external device, such as the server 220 or the user device 230 which generates the obstacle map based on the physical workspace information.

In operation S903, the robot or the external device may generate an optical trajectory of the robot based on a first configuration (e.g., a current position of the robot) and a second configuration (e.g., a preset destination position of the robot), and may identify a series of control inputs for moving the robot along the trajectory.

In detail, the robot or the external device may generate a cost-to-go function that defines a length of a collision-free path of the robot from a first configuration to a second configuration, using a first neural network, under the assumption that the robot is subject to non-holonomic constraints The first neural network may be a higher-order function network, and may be configured to obtain, as input, the physical workspace information, and output a set of weights that represents the cost-to-go function.

The robot or the external device may form a second neural network based on the set of weights output from the first neural network. The second neural network receives, as input, the first configuration and the second configuration, and outputs an estimated cost-to-go value from the first configuration to the second configuration. The robot or the external device may perform a pre-process of obtaining the first configuration, based on a control input, using a forward kinematics function.

Based on the estimated cost-to-go value, the robot or the external device may identify waypoints (e.g., a sequence of updated current configurations) of a trajectory from the first configuration to the second configuration, which minimizes the cost-to-go value. Also, the robot or the external device may identify a series of control inputs that enables the robot to move through the waypoints of the trajectory.

In operation S904, the robot may receive a motion control command including the sequence of the control inputs, and may move according to the motion control command along the trajectory that minimizes the cost-to-go.

Figure 12:
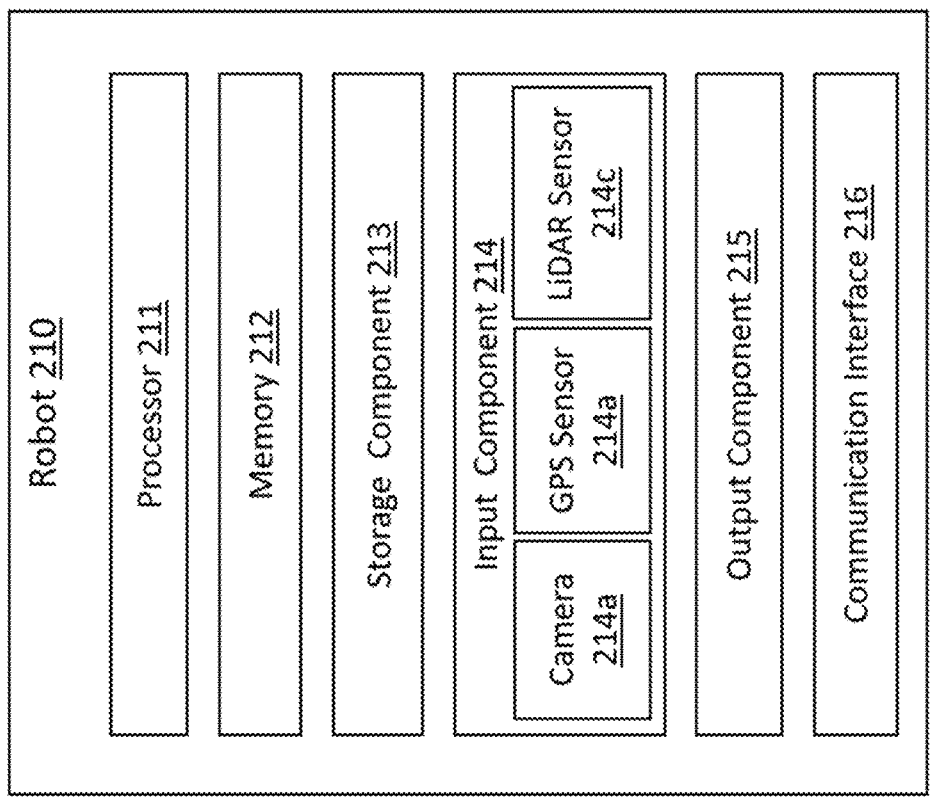
FIG. 12 is a diagram of components of a robot according to an embodiment of the present disclosure.

FIG. 12 is a diagram of components of a robot according to an embodiment of the present disclosure.

As shown in FIG. 12, the robot 210 may include a processor 211, a memory 212, a storage component 213, an input component 214, an output component 215, and a communication interface 216, which are connected via a bus that permits communication among the components.

The processor 211 is implemented in hardware, firmware, or a combination of hardware and software. The processor 211 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 211 includes one or more processors capable of being programmed to perform a function.

The memory 212 includes a random access memory (RAM), a read only memory (ROM), and/or another type of dynamic or static storage device (e.g., a flash memory, a magnetic memory, and/or an optical memory) that stores information and/or instructions for use by the processor 211.

The storage component 213 stores information and/or software related to the operation and use of the robot 210. For example, the storage component 213 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 214 includes a component that permits the robot 210 to receive information, such as via user input (e.g., a touch screen display, a keyboard, a keypad, a mouse, a button, a switch, and/or a microphone). The input component 214 include a sensor for sensing information, for example, such as a camera 214a, a global positioning system (GPS) sensor 214b, and a LiDAR sensor 241c, an accelerometer, a gyroscope, and/or an actuator.

The robot 210 may scan the surrounding environment using the camera 214a and the LiDAR sensor 241c, and may identify its location using the GPS sensor 214b, to obtain physical workspace information in operation S901 of FIG. 11.

The output component 215 includes a component that provides output information from the robot 210 (e.g., a display, a speaker, and/or one or more light-emitting diodes (LEDs)).

The communication interface 216 includes a transceiver-like component (e.g., a transceiver and/or a separate receiver and transmitter) that enables the robot 210 to communicate with other devices (e.g., the server 220 and the user device 230), such as via a wired connection, a wireless connection, or a combination of wired and wireless connections. The communication interface 216 may permit the robot 210 to receive information from another device and/or provide information to another device. For example, the communication interface 216 may include an Ethernet interface, an optical interface, a coaxial interface, an infrared interface, a radio frequency (RF) interface, a universal serial bus (USB) interface, a Wi-Fi interface, a cellular network interface, or the like.

The robot 210 may perform one or more processes described herein, such as operations S101-S105, S401-S406, and S901-S904. The robot 210 may perform these processes based on the processor 211 executing software instructions stored by a non-transitory computer-readable medium, such as the memory 212 and/or the storage component 213. A computer-readable medium is defined herein as a non-transitory memory device. A memory device includes memory space within a single physical storage device or memory space spread across multiple physical storage devices.

Software instructions may be read into the memory 212 and/or the storage component 213 from another computer-readable medium or from another device via the communication interface 216. When executed, software instructions stored in the memory 212 and/or the storage component 213 may cause the processor 211 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 12 are provided as an example. In practice, the robot 210 may include additional components, fewer components, different components, or differently arranged components than those shown in FIG. 12. Additionally, or alternatively, a set of components (e.g., one or more components) of the robot 210 may perform one or more functions described as being performed by another set of components of the robot 210.

Figure 13:
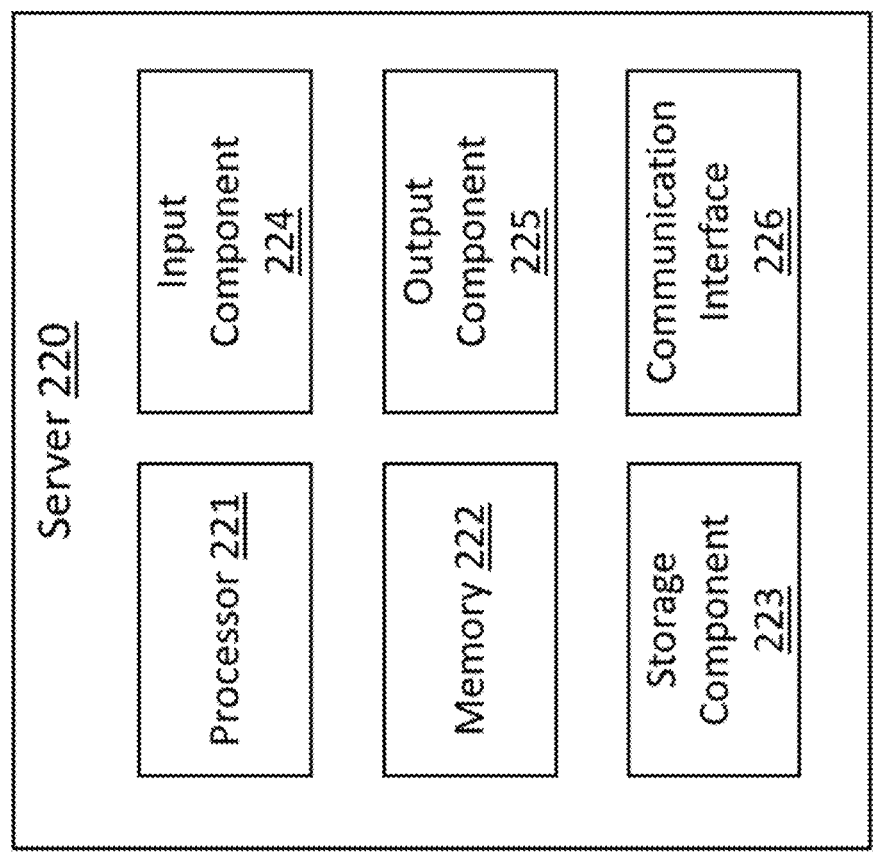
FIG. 13 illustrates components of a server according to an example embodiment of the present disclosure.

FIG. 13 illustrates components of a server according to an example embodiment of the present disclosure.

As shown in FIG. 13, a server 220 may include a processor 221, a memory 222, a storage component 223, an input component 224, an output component 225, and a communication interface 226, which are connected via a bus that permits communication among the components.

The processor 221 is implemented in hardware, firmware, or a combination of hardware and software. The processor 221 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 221 includes one or more processors capable of being programmed to perform a function.

The memory 222 includes a random access memory (RAM), a read only memory (ROM), and/or another type of dynamic or static storage device (e.g., a flash memory, a magnetic memory, and/or an optical memory) that stores information and/or instructions for use by the processor 221.

The storage component 223 stores information and/or software related to the operation and use of the robot 210 and the server 220. For example, the storage component 223 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 224 includes a component that permits the device 300 to receive information, such as via user input (e.g., a touch screen display, a keyboard, a keypad, a mouse, a button, a switch, and/or a microphone).

The output component 225 includes a component that provides output information from the server 220 (e.g., a display, a speaker, and/or one or more light-emitting diodes (LEDs)).

The communication interface 226 includes a transceiver-like component (e.g., a transceiver and/or a separate receiver and transmitter) that enables the server 220 to communicate with other devices (e.g., the robot 210 and the user device 230), such as via a wired connection, a wireless connection, or a combination of wired and wireless connections. The communication interface 226 may permit the server 220 to receive information from another device and/or provide information to another device. For example, the communication interface 226 may include an Ethernet interface, an optical interface, a coaxial interface, an infrared interface, a radio frequency (RF) interface, a universal serial bus (USB) interface, a Wi-Fi interface, a cellular network interface, or the like.

The server 220 may perform one or more processes described herein, such as operations S101-S105, S401-S406, and S901-S904. Regarding operation S101, the server 220 may receive physical workspace information from the robot 210, or from another external device. The server 220 may perform these processes based on the processor 221 executing software instructions stored by a non-transitory computer-readable medium, such as the memory 222 and/or the storage component 223. A computer-readable medium is defined herein as a non-transitory memory device. A memory device includes memory space within a single physical storage device or memory space spread across multiple physical storage devices.

Software instructions may be read into the memory 222 and/or the storage component 223 from another computer-readable medium or from another device via the communication interface 226. When executed, software instructions stored in memory 222 and/or storage component 223 may cause the processor 221 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 13 are provided as an example. In practice, the server 220 may include additional components, fewer components, different components, or differently arranged components than those shown in FIG. 13. Additionally, or alternatively, a set of components (e.g., one or more components) of the server 220 may perform one or more functions described as being performed by another set of components of the server 220.

FIG. 14 illustrates a service robot performing an assigned task in a cluttered environment according to embodiments of the present disclosure. The service robot may be a delivery robot, a serving robot, or a robot butler that is trained to move from a first configuration to a second configuration in an environment, while steering away from obstacles in the environment.

For example, as shown in FIG. 14, a service robot 400 may include a body 410, arms 420, hands 430, and wheels 440. The body 410 may include a camera 411, a microphone 412, and a touchpad 413.

The service robot 400 may move around a designated area (e.g., a house, a restaurant, a gas station, a charging station for electric vehicles, and a package delivery area, etc.) using the wheels 440, and may monitor the designated area through the camera 411 to perform various tasks assigned by a user.

To carry out an assigned task, the service robot 400 may include any one or any combination of the components illustrated in FIG. 12.

With reference to FIGS. 12 and 14, the service robot 400 may receive a task through the input component 224, such as the microphone 412, the touchpad 413, and/or a built-in wireless communication module. The task may include a command to move to a goal configuration. For example, the service robot 400 may receive, as the goal configuration, a table number in a restaurant in which the service robot 400 is configured to operate, and perform a task for moving to a location corresponding to the table number based on the processor 211 executing software programs stored in the memory 212.

For example, the camera 411 of the service robot 400 captures an image of a workspace and the processor 211 may perform operations S102-S105 to generate a trajectory from the current configuration of the service robot 400 to the goal configuration, and identify a sequence of control inputs corresponding to the trajectory, wherein each control input may be constituted with a combination of longitudinal velocity, a steering angle, and a gear direction of the service robot 400.

The processor 211 may apply the sequence of control inputs to the service robot 400 so that the service robot 400 moves to the goal configuration along the generated trajectory.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An electronic device for generating a trajectory of a target device from a current position to a goal position within an environment, the electronic device comprising:
   a memory configured to store instructions; and
   a processor configured to execute the instructions to:
   obtain physical workspace information associated with the environment in which the target device is configured to operate with non-holonomic constraints;
   input the physical workspace information to a first neural network to obtain a set of weights representing a cost-to-go function relating to a length of a collision-free path from one position to the goal position;
   identify a next position of the target device based on the current position and a motion control input of the target device;
   configure a second neural network based on the set of weights that are output from the first neural network, wherein the second neural network is trained to estimate the length of the collision-free path based on a training dataset that is selected through an adaptive sampling method of increasing a sampling probability based on a cost-to-go gradient of the length of the collision-free path; and
   input the identified next position of the target device and the goal position to the second neural network to identify the trajectory to the goal position, and the motion control input corresponding to the trajectory,
   wherein the electronic device or the target device corresponds to an autonomous driving device;
   wherein the adaptive sampling method is configured to generate the training dataset based on a ratio of each of the cost-to-go gradients to a corresponding Euclidean distance gradient; and
   wherein the processor is configured to generate the trajectory of the target device from a next position to the goal position based on the cost-to-go gradient so that an estimated cost is minimized, and to control the autonomous driving device to travel according to the trajectory based on the motion control input.

2. The electronic device of claim 1, wherein the training dataset is collected by:
   generating a Reed-Shepp tree based on sample physical workspace information;
   expanding the Reed-Shepp tree based on a Rapidly-Exploring Random Tree Star (RRT*) algorithm to obtain an expanded tree; and
   obtaining the training dataset from the expanded tree.

3. The electronic device of claim 2, wherein the obtaining the training dataset from the expanded tree comprises:
   sampling a tuple from the expanded tree, wherein the tuple comprises a first pair of two positions and a corresponding ground-truth cost-to-go between the first pair of two positions; and
   sampling a second pair of two positions from RRT* vertices of the expanded tree within a minimum turning radius of the target device.

4. The electronic device of claim 2, wherein the training dataset is collected by:
   after obtaining the training dataset from the expanded tree, sampling the training dataset based on the ratio of the cost-to-go gradient of a sample pair of two positions to the corresponding Euclidean distance gradient.

5. The electronic device of claim 4, wherein the sampling the training dataset comprises:

sampling the sample pair of two positions with the sampling probability that increases in direct proportion to the ratio.

6. The electronic device of claim 1, wherein the control input comprises any one or any combination of a longitudinal velocity, a steering angle, and a gear direction of the target device.

7. The electronic device of claim 1, wherein the first neural network and the second neural network are jointly trained to minimize a loss between the estimated length of the collision-free path and a ground-truth length, by back propagating the loss to the first neural network and the second neural network.

8. The electronic device of claim 1, wherein the physical workspace information is a two-dimensional image of the environment or a point cloud associated with the environment.

9. The electronic device of claim 1, wherein the electronic device and the target device correspond to the autonomous driving device that comprises:
wheels;
a camera configured to capture an image of the environment, to obtain the physical workspace information; and
an input interface configured to receive the goal position, and
wherein the autonomous driving device is configured to control the wheels according to the motion control input to travel along the trajectory.

10. The electronic device of claim 1, wherein the electronic device is a server and the target device is the autonomous driving device,
wherein the server comprises an input interface configured to receive the goal position through a user command,
wherein the autonomous driving device comprises:
wheels;
a camera configured to capture an image of the environment; and
a communication interface configured to:
transmit the image of the environment to the server, to enable the server to obtain the physical workspace information based on the image; and
receive, from the server, the motion control input corresponding to the trajectory, and
wherein the autonomous driving device is configured to control the wheels according to the motion control input to travel along the trajectory.

11. A method for an electronic device generating a trajectory of a target device from a current position to a goal position within an environment, the method comprising:
capturing an image of the environment;
obtaining physical workspace information associated with the environment in which the target device is configured to operate with non-holonomic constraints;
inputting the physical workspace information to a first neural network to obtain a set of weights representing a cost-to-go function relating to a length of a collision-free path from one position to the goal position;
identifying a next position of the target device based on the current position and a motion control input of the target device;
configuring a second neural network based on the set of weights that are output from the first neural network, wherein the second neural network is trained to estimate the length of the collision-free path based on a training dataset that is selected through an adaptive sampling method of increasing a sampling probability based on a cost-to-go gradient of the length of the collision-free path; and
inputting the identified next position of the target device and the goal position to the second neural network to identify the trajectory to the goal position, and the motion control input corresponding to the trajectory,
wherein the electronic device or the target device is an autonomous driving device;
wherein the adaptive sampling method is configured to generate the training dataset based on a ratio of each of the cost-to-go gradients to a corresponding Euclidean distance gradient; and
wherein the electronic device is configured to generate the trajectory of the target device from a next position to the goal position based on the cost-to-go gradient so that an estimated cost is minimized, and to control the autonomous driving device to travel according to the trajectory based on the motion control input.

12. The method of claim 11, wherein the training dataset is collected by:
generating a Reed-Shepp tree based on sample physical workspace information;
expanding the Reed-Shepp tree based on an a Rapidly-Exploring Random Tree Star (RRT*) algorithm to obtain an expanded tree; and
obtaining the training dataset from the expanded tree.

13. The method of claim 12, wherein the obtaining the training dataset from the expanded tree comprises:
sampling a tuple from the expanded tree, wherein the tuple comprises a first pair of two positions and a corresponding ground-truth cost-to-go between the first pair of two positions; and
sampling a second pair of two positions from RRT* vertices of the expanded tree within a minimum turning radius of the target device.

14. The method of claim 12, further comprising:
after obtaining the training dataset from the expanded tree, sampling the training dataset based on the ratio of the cost-to-go gradient of a sample pair of two positions to the corresponding Euclidean distance gradient.

15. The method of claim 14, wherein the sampling the training dataset comprises:
sampling the sample pair of two positions with the sampling probability that increases in direct proportion to the ratio.

16. The method of claim 11, wherein the control input comprises any one or any combination of a longitudinal velocity, a steering angle, and a gear direction of the target device.

17. The method of claim 11, wherein the first neural network and the second neural network are jointly trained to minimize a loss between the estimated length of the collision-free path and a ground-truth length, by back propagating the loss to the first neural network and the second neural network.

18. The method of claim 11, wherein the physical workspace information is a two-dimensional image of the environment or a point cloud associated with the environment.

* * * * *